US012596547B2

(12) United States Patent
Gao et al.

(10) Patent No.: US 12,596,547 B2
(45) Date of Patent: Apr. 7, 2026

(54) VERSION MANAGEMENT FOR MACHINE LEARNING PIPELINE BUILDING

(71) Applicant: INTERNATIONAL BUSINESS MACHINES CORPORATION, Armonk, NY (US)

(72) Inventors: Lei Gao, Xian (CN); Jin Wang, Xian (CN); A Peng Zhang, Xian (CN); Kai Li, Xian (CN); Matthew Wayne Howard, Racine, MN (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 18/060,794

(22) Filed: Dec. 1, 2022

(65) Prior Publication Data

US 2024/0184567 A1     Jun. 6, 2024

(51) Int. Cl.
*G06F 8/71*           (2018.01)

(52) U.S. Cl.
CPC .................................... *G06F 8/71* (2013.01)

(58) Field of Classification Search
CPC ....................................................... G06F 8/71
See application file for complete search history.

(56) References Cited

U.S. PATENT DOCUMENTS

| | | | |
|---|---|---|---|
| 8,745,588 B2 | 6/2014 | Kawashima et al. | |
| 9,600,264 B2 | 3/2017 | Draper | |
| 10,956,916 B1 | 3/2021 | Abreu | |
| 11,200,049 B2 | 12/2021 | Whalen et al. | |
| 11,586,436 B1 * | 2/2023 | Jennings .................. | G06F 8/61 |
| 11,947,449 B2 | 4/2024 | Gao et al. | |
| 2013/0290944 A1 | 10/2013 | Menon | |
| 2014/0325480 A1 | 10/2014 | Bhagavatula | |

(Continued)

FOREIGN PATENT DOCUMENTS

| | | |
|---|---|---|
| CN | 1734421 A | 2/2006 |

OTHER PUBLICATIONS

Van Der Weide, Tom, et al. "Versioning for end-to-end machine learning pipelines." Proceedings of the 1st Workshop on Data Management for End-to-End Machine Learning. 2017. (Year: 2017).*

(Continued)

*Primary Examiner* — Bradley A Teets
*Assistant Examiner* — Joanne G Macasiano
(74) *Attorney, Agent, or Firm* — Lily Neff

(57)          ABSTRACT

An embodiment for an improved method of automated version management for machine learning pipeline development is provided. The embodiment may compute a quality value of a target machine learning pipeline at a predetermined regular interval and automatically save updated versions of the target machine learning pipeline. The embodiment may extract a series of key features from detected versions of the target machine learning pipeline and cluster the detected versions of the target machine learning model pipeline by the extracted series of key features. The embodiment may identify a highest-quality version within each of a series of generated clusters. The embodiment may compute similarity scores for subsets of versions within each of the series of generated clusters. The embodiment may generate and output to a user, a visual representation of the series of generated clusters including version quality data and version similarity data.

18 Claims, 4 Drawing Sheets

(56) References Cited

U.S. PATENT DOCUMENTS

| | | | | |
|---|---|---|---|---|
| 2015/0067647 | A1 | 3/2015 | Bakowski et al. | |
| 2018/0129596 | A1 | 5/2018 | Anaya et al. | |
| 2018/0253372 | A1 | 9/2018 | Colaiacomo et al. | |
| 2019/0108417 | A1* | 4/2019 | Talagala | G06F 18/217 |
| 2019/0205128 | A1* | 7/2019 | van Schaik | G06F 8/77 |
| 2020/0089485 | A1* | 3/2020 | Sobran | G06F 18/23213 |
| 2020/0364606 | A1* | 11/2020 | Sawant | G06F 8/71 |
| 2020/0401696 | A1* | 12/2020 | Ringlein | G06F 21/552 |
| 2021/0035021 | A1 | 2/2021 | Sasson | |
| 2021/0081310 | A1* | 3/2021 | Gottschlich | G06F 8/75 |
| 2021/0081837 | A1* | 3/2021 | Polleri | G06N 5/022 |
| 2021/0081848 | A1 | 3/2021 | Polleri | |
| 2023/0205676 | A1* | 6/2023 | Freeman | G06F 11/368 |
| | | | | 717/124 |
| 2023/0252107 | A1* | 8/2023 | Hamamoto | G06F 18/214 |
| | | | | 706/12 |
| 2024/0004630 | A1* | 1/2024 | Chandra | G06F 8/71 |
| 2024/0134774 | A1* | 4/2024 | Sydow | G06F 16/2379 |

OTHER PUBLICATIONS

Sugimura, Peter, and Florian Hartl. "Building a reproducible machine learning pipeline." arXiv preprint arXiv:1810.04570 (2018). (Year: 2018).*

Nguyen, Phuong T., et al. "An automated approach to assess the similarity of GitHub repositories." Software Quality Journal 28.2 (2020): 595-631. (Year: 2020).*

Van der Weide, Tom, et al. "Versioned machine learning pipelines for batch experimentation." Machine Learning Systems workshop at NIPS. 2016. (Year: 2016).*

Bachwani, et al., "Mojave: A Recommendation System for Software Upgrades," Workshop on Managing Systems Automatically and Dynamically [conference], Oct. 2012, 7 pages, Retrieved from the Internet: <URL: https://www.researchgate.net/publication/234128761_ Mojav.

Gao, et al., "Migration Between Software Products," Application and Drawings, filed Jul. 7, 2022, 41 Pages, Related U.S. Appl. No. 17/811,198.

Olchówka, "Migrating Users to a New Product," Platform Updates [online], Jan. 23, 2014 [accessed on Sep. 9, 2021], 20 pages, Retrieved from the Internet: <URL: https://developers.livechat.com/ updates/migrate-users-new-product>.

Sutton, "Product Migration: Convincing customers to change behavior with a 7-part email campaign," MarketingSherpa [case study], Apr. 26, 2011 [accessed on Sep. 9, 2021], 6 pages, Retrieved from the Internet: <URL: https://www.marketingsherpa.com/article/case-study/convincing-customers-to-change-behavior>.

IBM: List of IBM Patents or Patent Applications Treated as Related (Appendix P), dated Jan. 10, 2024 2 pages.

Mell, et al., "The NIST Definition of Cloud Computing", National Institute of Standards and Technology, Special Publication 800-145, Sep. 2011, 7 pages.

IBM, List of IBM Patents or Patent Applications Treated as Related, Appendix P, 2 pages, filed herewith, Oct. 14, 2024.

* cited by examiner

100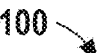

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

VERSION MANAGEMENT PROGRAM          150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

Figure 1

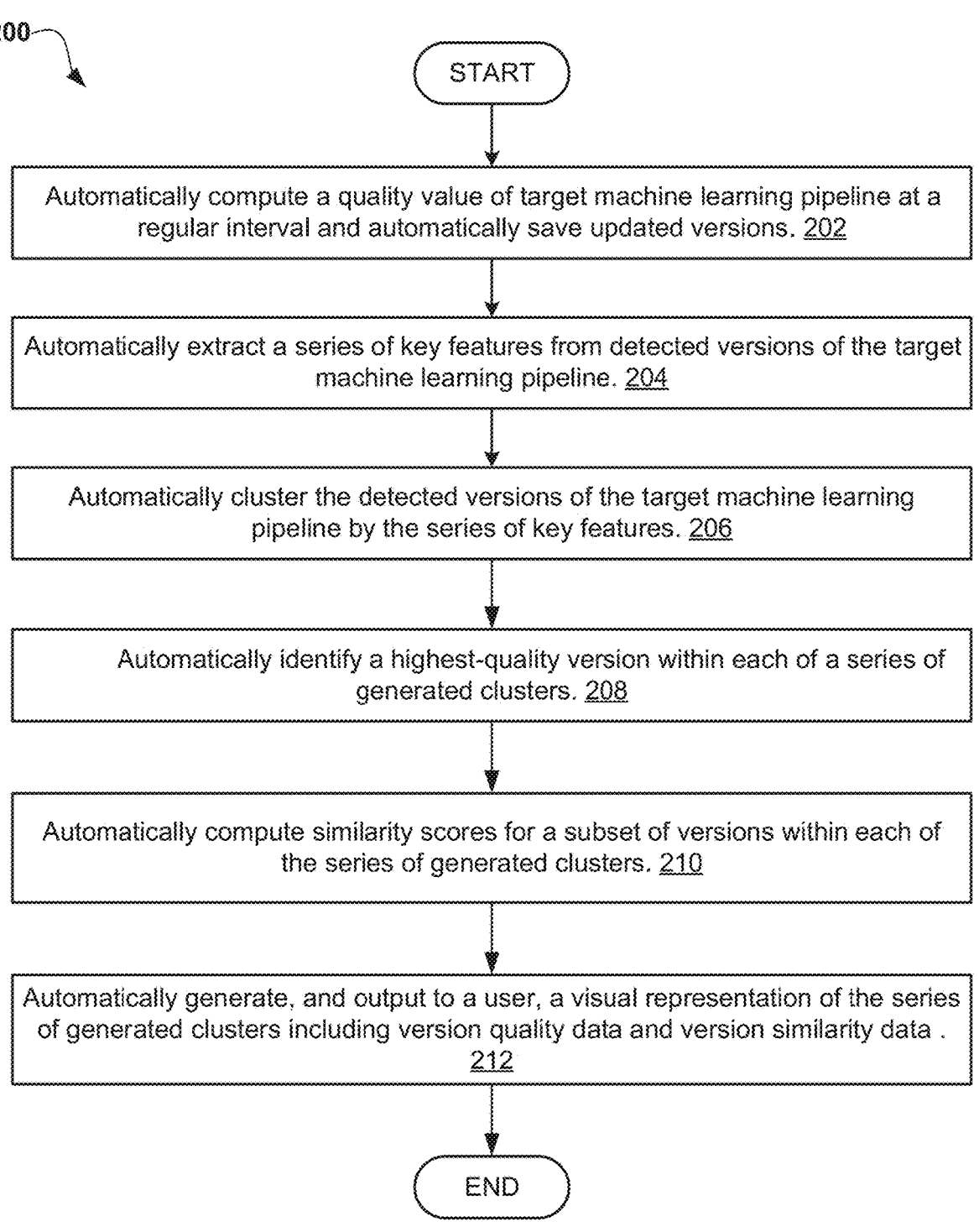

200

START

Automatically compute a quality value of target machine learning pipeline at a regular interval and automatically save updated versions. 202

Automatically extract a series of key features from detected versions of the target machine learning pipeline. 204

Automatically cluster the detected versions of the target machine learning pipeline by the series of key features. 206

Automatically identify a highest-quality version within each of a series of generated clusters. 208

Automatically compute similarity scores for a subset of versions within each of the series of generated clusters. 210

Automatically generate, and output to a user, a visual representation of the series of generated clusters including version quality data and version similarity data. 212

END

Figure 2

VERSION MANAGEMENT FOR MACHINE LEARNING PIPELINE BUILDING

BACKGROUND

The present application relates generally to development of machine learning pipelines, and more particularly, to improved methods of automated version management for machine learning pipeline development.

Developing a machine learning (ML) pipeline solution for a given business problem is often an iterative process during which many unique versions of the machine learning pipeline are saved. Developers may save dozens or even hundreds of versions of a given ML pipeline that is under development as progress is continuously made. At any given time during a given build, developers may wish to restore a previously saved version of a ML pipeline to continue development from a certain stage of development that precedes unwanted changes, unforeseen problems, or undesirable errors. Accordingly, version management is a highly utilized process for developers building a machine learning pipeline solution.

SUMMARY

According to one embodiment, a method, computer system, and computer program product for carrying out improved methods of automated version management for machine learning pipeline development is provided. The embodiment may include automatically computing a quality value of a target machine learning pipeline at a predetermined regular interval and automatically saving updated versions of the target machine learning pipeline based on the computed quality value. The embodiment may also include automatically extracting a series of key features from detected versions of the target machine learning pipeline. The embodiment may further include automatically clustering the detected versions of the target machine learning model pipeline by the extracted series of key features. The embodiment may also include automatically identifying a highest-quality version within each of a series of generated clusters. The embodiment may also include automatically computing similarity scores for subsets of the detected versions within each of the series of generated clusters. The embodiment may further include automatically generating, and outputting to a user, a visual representation of the series of generated clusters including version quality data and version similarity data.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 1 illustrates an exemplary networked computer environment according to at least one embodiment;

FIG. 2 illustrates an operational flowchart for a process of carrying out improved methods of automated version management for machine learning pipeline development according to at least one embodiment;

DETAILED DESCRIPTION

Figure 3:
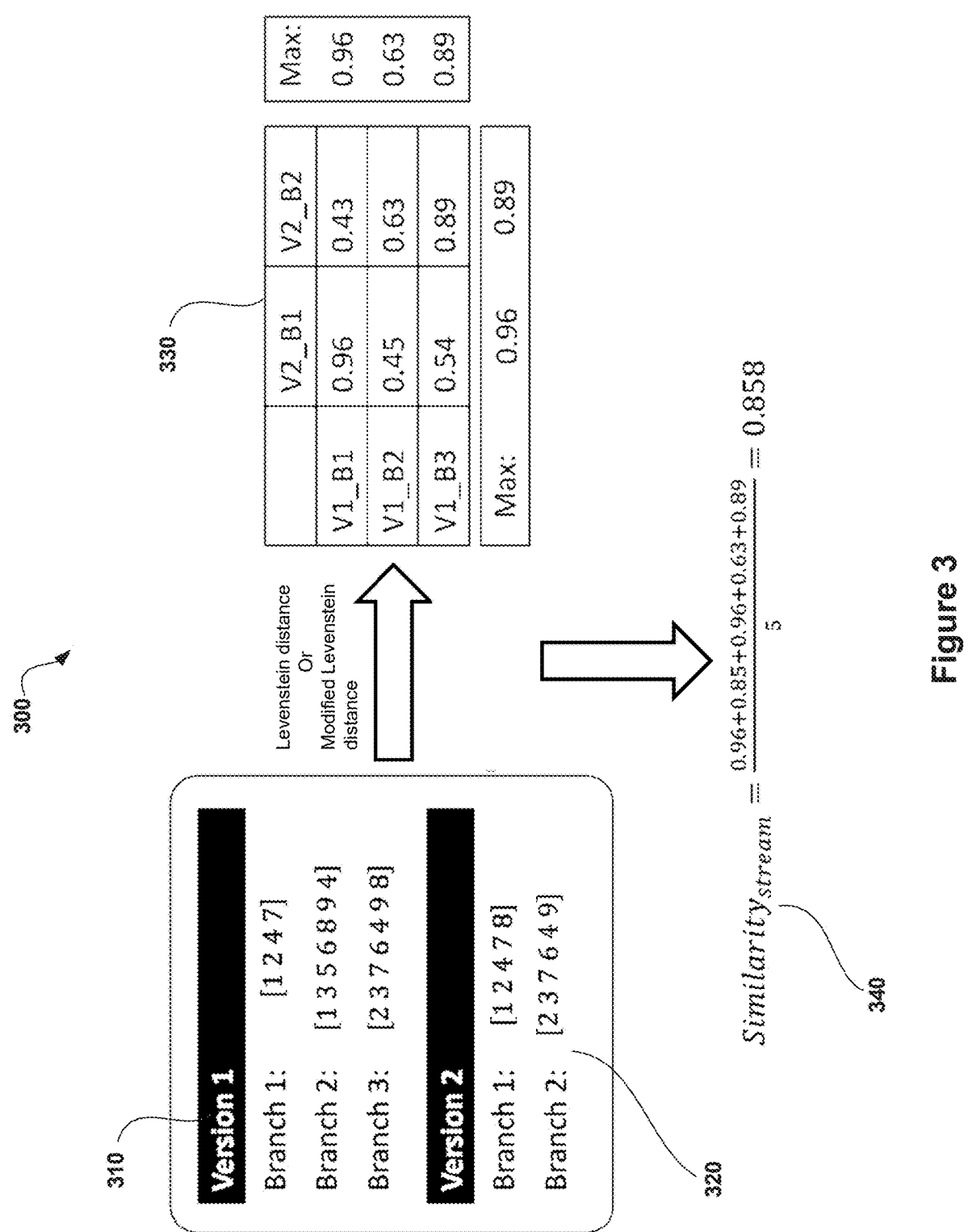
FIG. 3 depicts an illustrative process of computing similarity scores for two differing versions of a ML pipeline using a Levenshtein distance metric according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate to development of machine learning pipelines, and more particularly, to improved methods of automated version management for machine learning pipeline development. The following described exemplary embodiments provide a system, method, and program product to, among other things, automatically compute a quality value of a target machine learning pipeline at a predetermined regular interval and automatically save updated versions of the target machine learning pipeline based on the computed quality value, automatically extract a series of key features from detected versions of the target machine learning pipeline, automatically cluster the detected versions of the target machine learning model pipeline by the extracted series of key features, automatically identify a highest-quality version within each of a series of generated clusters, and automatically compute similarity scores for subsets of the detected versions within each of the series of generated clusters. The described exemplary embodiments may then automatically generate and output to a user, a visual representation of the series of generated clusters including version quality data and version similarity data. Therefore, the presently described embodiments have the capacity to improve methods of automated version management for machine learning pipeline development by providing a method that provides for automated saving of versions based on measurable quality improvements. The presently described embodiments further improve version management by utilizing an intelligent process configured to generate and output visual representations of all saved versions of a given machine learning pipeline under development while simultaneously conveying version quality data and version similarity data within the context of chronological development. This provides developers with more data to both save time and improve their ability to make decisions when engaging in version management during development of a machine learning pipeline solution.

As previously described, developing a machine learning (ML) pipeline solution for a given business problem is often an iterative process during which many unique versions of the machine learning pipeline are saved. Developers may save dozens or even hundreds of versions of a given ML pipeline that is under development as progress is continuously made. At any given time during a given build, developers may wish to restore a previously saved version of a ML pipeline to continue development from a certain stage of development that precedes unwanted changes, unforeseen problems, or undesirable errors. Accordingly, version management is a highly utilized process for developers building a machine learning pipeline solution.

However, version management is often a challenge for developers as there is typically a shortage of version information for them to rely on. Typically, developers merely have access to a limited amount of static and basic version information such as version name, and the time and date when the version was saved. Additionally, if the number of saved versions for a given ML pipeline in development becomes too large, it becomes increasingly challenging for developers to identify which versions are meaningful for purposes restoring a previously saved version. Developers may also struggle to recall or understand which saved versions are similar. Thus, developers are often faced with a simple list of saved versions presenting little or no information relating to version quality or version similarity, making it difficult to have a well-rounded understanding of the development process as versions are continuously saved. This results in developers having to spend time investigating individual saved versions to obtain the information needed to make an appropriate version management decision.

Accordingly, a method, computer system, and computer program product for improved methods of automated version management for machine learning pipeline development would be advantageous. The method, system, and computer program product may automatically compute a quality value of a target machine learning pipeline at a predetermined regular interval and automatically save updated versions of the target machine learning pipeline based on the computed quality value. The method, system, computer program product may automatically extract a series of key features from detected versions of the target machine learning pipeline. The method, system, computer program product may then automatically cluster the detected versions of the target machine learning model pipeline by the extracted series of key features. Next, the method, system, computer program product may automatically identify a highest-quality version within each of a series of generated clusters. The method, system, computer program product may then automatically compute similarity scores for subsets of the detected versions within each of the series of generated clusters. Thereafter, the method, system, computer program product may automatically generate, and output to a user, a visual representation of the series of generated clusters including version quality data and version similarity data. In turn, the method, system, computer program product has provided improved methods of automated version management for machine learning pipeline development by providing a method that provides for automated saving of versions based on measurable quality improvements. The presently described embodiments further improve version management by utilizing an intelligent process configured to generate and output visual representations of all saved versions of a given machine learning pipeline under development while simultaneously conveying version quality data and version similarity data within the context of chronological development. This provides developers with more data to both save time and improve their ability to make decisions when engaging in version management during development of a machine learning pipeline solution.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as version management program/code 150. In addition to version management code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and version management code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in version management code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in version management program 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the version management program 150 may be a program capable of automatically computing a quality value of a target machine learning pipeline at a predetermined regular interval and automatically saving updated versions of the target machine learning pipeline based on the computed quality value. Version management program 150 may then automatically extract a series of key features from detected versions of the target machine learning pipeline. Next, version management program 150 may automatically cluster the detected versions of the target machine learning model pipeline by the extracted series of key features. Then, version management program 150 may automatically identify a highest-quality version within each of a series of generated clusters. Next, version management program 150 may automatically compute similarity scores for subsets of the detected versions within each of the series of generated clusters. Thereafter, version management program 150 may automatically generate, and output to a user, a visual representation of the series of generated clusters including version quality data and version similarity data. In turn, version management program 150 has provided improved methods of automated version management for machine learning pipeline development by providing a method that provides for automated saving of versions based on measurable quality improvements. The presently described embodiments further improve version management by utilizing an intelligent process configured to generate and output visual representations of all saved versions of a given machine learning pipeline under development while simultaneously conveying version quality data and version similarity data within the context of chronological development. This provides developers with more data to both save time and improve their ability to make decisions when engaging in version management during development of a machine learning pipeline solution.

Referring now to FIG. 2, an operational flowchart for a process 200 of carrying out improved methods of automated version management for machine learning pipeline development according to at least one embodiment is provided.

At 202, version management program 150 may automatically compute a quality value of a target machine learning pipeline (sometimes referred to as the target model build) at a predetermined regular interval and automatically save updated versions of the target machine learning pipeline based on the computed quality value. This ensures that version management program 150 automatically saves at least one unique version of a given machine learning pipeline stream anytime that a significant amount of progress or quality improvement is made. The predetermined regular interval may be any suitable time interval that ensures adequate monitoring of quality improvements to a given ML pipeline stream being developed. There are various ways in which embodiments of the present disclosure may measure or compute quality values. In some embodiments, for example, the computed quality value for a given ML model build in development may be determined by considering the following aspects:

The quality of models in the model's building branches may be considered. For example, if it is supposed there are n models in a given stream, then the quality of the models may be computed as:

$$Quality_{model} = \frac{1}{n}\sum_{i=0}^{n} ModelAccuracy_i$$

The quality of the output data in the data transformation branches may also be considered. For example, if it is supposed that there are n data transformation output, then the quality of data transformation output data may be computed as:

$$Quality_{data} = \frac{1}{n}\sum_{i=0}^{n} DataQuality_i$$

In embodiments, the data quality of each data transformation result may be evaluated by various statistics, such as, for example, missing value proportion, Skewness, Kurtosis, etc. For example, in an illustrative embodiment in which version management program 150 is taking missing value proportions for example, the data quality from each data transformation branch may be computed using the following exemplary equation, where there are m new generated fields, and total record count is p, with each new generated field having q missing values:

$$DataQuality = \frac{1}{m}\sum_{i=0}^{m} \frac{p - q_i}{p}$$

Once version management program 150 has computed the above-described values, it may then compute a final quality value (corresponding to the computed quality value taken at regular intervals) using the following formula:

$$Quality_{stream} = Quality_{model} + Quality_{data} - OffsetValue_{error}*Count_{error}$$

where the OffsetValue$_{error}$ is defined as a constant value, for example, 1, which degrades the version quality.

Version management program 150 will repeatedly compute the quality value for the target ML pipeline every time the predetermined regular interval is met and then store the associated data. For example, version management program 150 may compute the quality value every 15 minutes. If the computed quality value surpasses a predetermined comparative quality threshold, as it relates to the quality value for a last-saved version of the target ML pipeline, then version management program 150 may automatically save a new version of the target ML pipeline. In other embodiments, version management program 150 may be configured to notify a user to manually save a version of the target ML pipeline. The predetermined comparative quality threshold represents a threshold value for comparing a historical quality value associated with the most recently (last) saved version of the target ML pipeline with the computed quality value for the current or present version of the ML pipeline that exists at a time corresponding to the next predetermined regular interval.

For example, in one embodiment, version management program 150 may compute a quality value for a target ML pipeline, and then 15 minutes later, after the predetermined regular interval has passed, compute another quality value for the target ML pipeline. If the computed quality value for the present ML pipeline is above a predetermined comparative quality threshold as it relates to the historical quality value computed 15 minutes prior by version management program 150, then version management program 150 may automatically save a new version of the target ML pipeline. Functionally, this ensures that version management program 150 is automatically saving a new version of the target ML pipeline in development anytime that a significant amount of progress is made, as shown by the measurable increase in computed model quality. The comparative quality threshold may be changed or adjusted as desired by a user of version management program 150 to require greater progress or less progress be made with respect to the quality of the target ML pipeline being built before automatically saving.

At 204, version management program 150 may automatically extract a series of key features from detected versions of the target machine learning pipeline. Detected versions may include all saved versions detectable by version management program 150, including those that have been saved automatically or manually. Machine learning pipelines under development are typically kept as structured memory objects. Accordingly, any suitable procedure for extracting the key features may be used. The extracted key features may include, for example, number of data transformation nodes, number of flow branches, number of estimator nodes, number of built models, number of data export nodes, etc. Version management program 150 may store data corresponding to the extracted features. In embodiments, version management program 150 may also tabularize the extracted series of key features.

Figure 4:
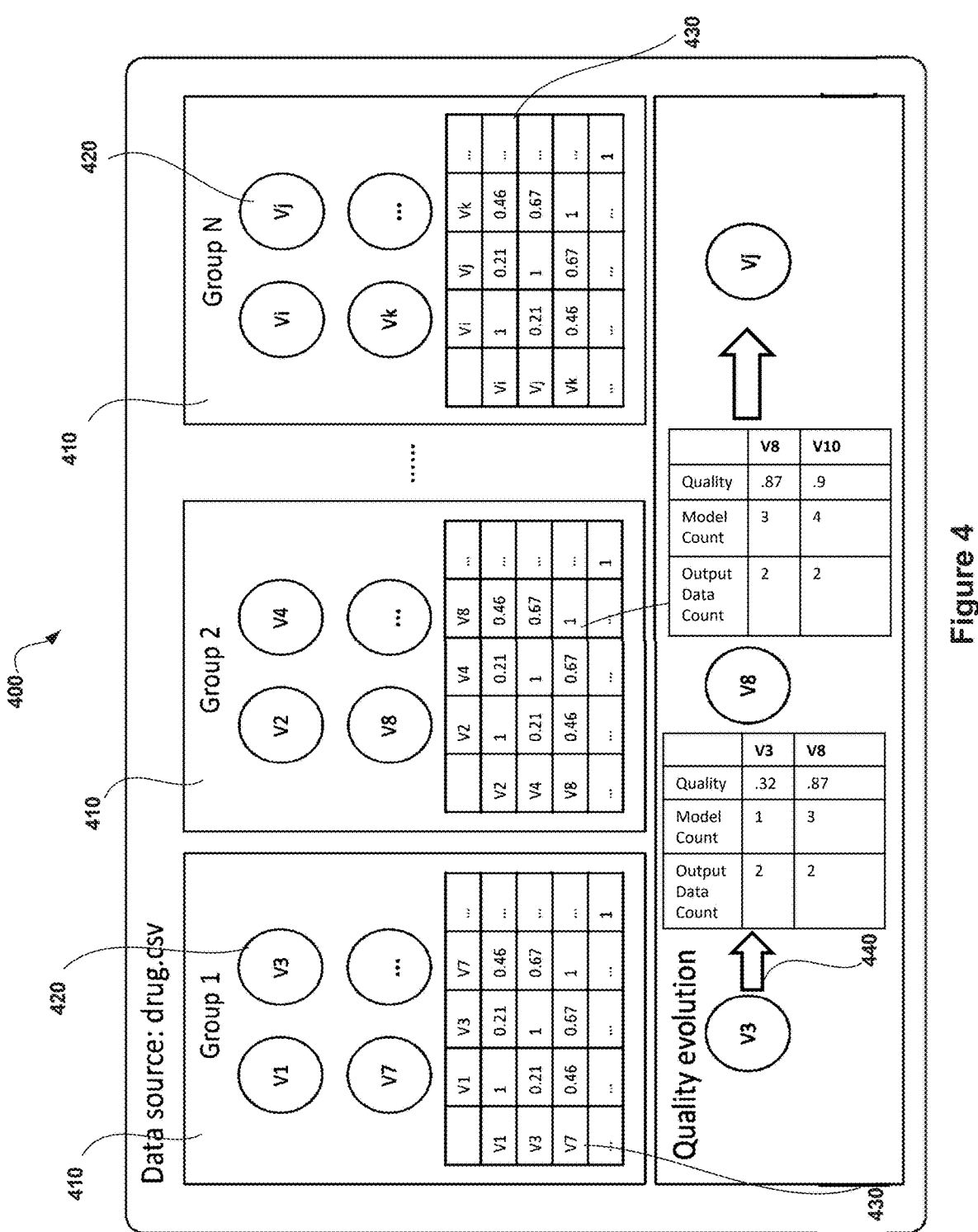
FIG. 4 illustrates an exemplary visual representation that may be output by a system carrying out improved methods of automated version management for machine learning pipeline development according to at least one embodiment.

Next, at 206, version management program 150 may automatically cluster the detected versions of the target machine learning model pipeline by the extracted series of key features. Version management program 150 may utilize any suitable clustering algorithm to generate the clusters of versions, such as, for example, k-means or Kohenen clustering algorithms. For example, as seen in FIG. 4, version management program 150 may generate clusters identified in FIG. 4 as Group 1, Group 2 . . . Group N. As shown, the first cluster of saved versions in Group 1 includes 'V1', 'V3' and 'V7' corresponding to three unique saved versions of the target ML pipeline being developed, each of the saved versions in the cluster sharing a set of extracted key features.

Next, at 208, version management program 150 may automatically identify a highest-quality version within each of a series of generated clusters. Version management program 150 may identify the high-quality version in each cluster using the computed quality values from step 202. In embodiments, as shown in FIG. 4 (and discussed more below at step 212), version management program 150 may visually highlight the highest-quality version within each cluster and may be configured to present a user with additional version data, such as for example, quality value, model count, output data, or any other known data points stored by version management programs at step 202 or 204.

At 210, version management program 150 may automatically compute similarity scores for subsets of the detected versions within each of the series of generated clusters. The subsets of versions refer to unique pairs of individual versions both contained within the same cluster. The computed similarity scores function to provide information about how closely related specific pairs of individual versions contained within the same cluster (subsets of versions) are to each other. In embodiments, because a given ML pipeline stream that is being built may include several branches, version management program 150 may be configured to encode each branch into a machine learning operation sequence. Version management program 150 may, for example, encode each operation into numerical values (unique IDs) such that all the operations in the product form a finite operation set. For example, if an exemplary ML pipeline stream includes several operations including op1, op2, op 3, op 4, and op5, version management program 150 may encode each operation with an encode value, of 1, 2, 3, 4, and 5 respectively. In embodiments, to compute sequence similarity between two versions, version management program 150 may be configured to cross compute the similarity of a branch between a first version and a second version being compared. For example, version management program 150 may compute the similarity values using Levenshtein distance string metrics for measuring distances between sequences corresponding to each version. In other embodiments, version management program 150 may be configured to utilize a modified Levenshtein distance theory which computes the similarity for two sequences with different lengths and further considers operation category and input/output parameters for the same operation.

In embodiments, version management program 150 may further be configured to determine maximum similarity values corresponding to each branch present within two differing versions and then compute the average values from them as a final similarity score between the two versions.

After comparing the similarities between individual branches, version management program 150 then computes a final similarity score for each version (stream) of the ML pipeline being developed. In embodiments, version management program 150 may utilize an exemplary formula that may be written as follows:

$$\text{Similarity}_{stream} = \frac{1}{n}\sum_{i=0}^{n}\text{Similarity}_{Branch_i}$$

FIG. 3 depicts an illustrative process 300 of computing similarity scores for two differing versions (two differing streams) using a Levenshtein distance metric and the above-described formula for stream similarity according to at least one embodiment. As shown in FIG. 3, a first version 310 and a second version 320 are being compared. After encoding the operations associated with each branch, the Levenshtein distance metric is used to measure distances between the sequences to generate the data in table 330. Finally at 340 the similarity score of the streams is calculated using the above-described stream similarity formula. The similarity of the two streams refers to the similarity between the pair of versions being compared (i.e. the subsets of versions being compared, in this case version 1 and version 2 which are contained in a shared cluster of versions) based upon the branches contained therein and their respective sequence lengths.

Finally, at 212, version management program 150 may automatically generate and output to a user, a visual representation of the series of generated clusters including version quality data and version similarity data. The generated visual representation may be output and displayed using any suitable user interface. FIG. 4 illustrates an exemplary visual representation 400 for an exemplary target machine learning pipeline in development according to at least one embodiment. As shown, clusters 410 are visually shown with highest-quality versions 420 highlighted in each cluster. Tables 430 depict similarity data between versions sharing a cluster. And finally, a quality evolution visual 440 depicts a chronological evolution for the target ML pipeline illustrating highest-quality versions at each stage along with additional quality and similarity data that was computed or used throughout process 200 described above.

It may be appreciated that version management program 150 has thus provided improved methods of automated version management for machine learning pipeline development by providing a method that provides for automated saving of versions based on measurable quality improvements. The presently described embodiments further improve version management by utilizing an intelligent process configured to generate and output visual representations of all saved versions of a given machine learning pipeline under development while simultaneously conveying version quality data and version similarity data within the context of chronological development. This provides developers with more data to both save time and improve their ability to make decisions when engaging in version management during development of a machine learning pipeline solution.

It may be appreciated that FIG. 2 provides only an illustration of an exemplary implementation and does not imply any limitations with regard to how different embodiments may be implemented. Many modifications to the depicted environment may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of automated version management for machine learning pipeline development, the method comprising:

computing a quality value of a target machine learning pipeline at a predetermined regular interval, and automatically saving updated versions of the target machine learning pipeline based on the computed quality value;

extracting a series of key features from detected versions of the target machine learning pipeline;

clustering the detected versions of the target machine learning model pipeline by the extracted series of key features;

identifying a highest-quality version within each of a series of generated clusters;

computing similarity scores for subsets of the detected versions within each of the series of generated clusters for each version of the target machine learning pipeline being developed, wherein different versions of the series are analyzed to determine when a set of unique pairs of one or more individual versions exist that are both contained within a same cluster and encoding each branch into a machine learning operation sequence;

computing the similarity scores for the subsets of the detected versions within each of the series of generated clusters by automatically encoding a series of operations associated with branches corresponding to the subsets of versions;

computing a final similarity score for each version of the target machine learning pipeline by averaging values from each set of unique pairs;

generating and outputting to a user, using the final similarity score, a visual representation of the series of generated clusters including version quality data and version similarity data, wherein the visual representation includes a quality evolution visual depicting the highest-quality versions from each of the series of generated clusters in combination with the version quality data; and automatically saving at least one unique version of a given machine learning pipeline stream anytime a preselected amount of changes or modifications have been made for a later use in management of the given machine learning pipeline stream.

2. The computer-based method of claim 1, wherein automatically computing the quality value of the target machine learning pipeline at the predetermined regular interval and automatically saving updated versions of the target machine learning pipeline based on the computed quality value further comprise:

automatically comparing the target machine learning pipeline to a previously saved iteration of the target machine learning pipeline, and saving an updated version of the target machine learning pipeline each time the computed quality value surpasses a predetermined comparative quality threshold.

3. The computer-based method of claim 1, wherein the series of extracted key features comprise one or more of a number of data transformation nodes, a number of flow branches, a number of estimator nodes, a number of built models, and a number of data export nodes.

4. The computer-based method of claim 3, wherein the series of extracted key features are tabularized and stored.

5. The computer-based method of claim 1, wherein automatically computing the similarity scores for the subsets of the detected versions within each of the series of generated clusters further comprises:

automatically cross computing branch similarity values between the branches corresponding to the subsets of versions using a Levenshtein distance metric.

6. The computer-based method of claim 1, wherein automatically generating, and outputting to a user, the visual representation of the series of generated clusters including the version quality data and the version similarity data further comprises:

automatically tabularizing the computed similarity scores.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

a computer-based method of automated version management for machine learning pipeline development, the method comprising:

computing a quality value of a target machine learning pipeline at a predetermined regular interval, and automatically saving updated versions of the target machine learning pipeline based on the computed quality value;

extracting a series of key features from detected versions of the target machine learning pipeline;

clustering the detected versions of the target machine learning model pipeline by the extracted series of key features;

identifying a highest-quality version within each of a series of generated clusters;

computing similarity scores for subsets of the detected versions within each of the series of generated clusters for each version of the target machine learning pipeline being developed, wherein different versions of the series are analyzed to determine when a set of unique pairs of one or more individual versions exist that are both contained within a same cluster and encoding each branch into a machine learning operation sequence;

computing the similarity scores for the subsets of the detected versions within each of the series of generated clusters by automatically encoding a series of operations associated with branches corresponding to the subsets of versions;

computing a final similarity score for each version of the target machine learning pipeline by averaging values from each set of unique pairs;

generating and outputting to a user, using the final similarity score, a visual representation of the series of generated clusters including version quality data and version similarity data, wherein the visual representation includes a quality evolution visual depicting the highest-quality versions from each of the series of generated clusters in combination with the version quality data; and automatically saving at least one unique version of a given machine learning pipeline stream anytime a preselected amount of changes or modifications have been made for a later use in management of the given machine learning pipeline stream.

8. The computer system of claim 7, wherein automatically computing the quality value of the target machine learning pipeline at the predetermined regular interval and automatically saving updated versions of the target machine learning pipeline based on the computed quality value further comprise:

automatically comparing the target machine learning pipeline to a previously saved iteration of the target machine learning pipeline, and saving an updated version of the target machine learning pipeline each time the computed quality value surpasses a predetermined comparative quality threshold.

9. The computer system of claim 7, wherein the series of extracted key features comprise one or more of a number of data transformation nodes, a number of flow branches, a number of estimator nodes, a number of built models, and a number of data export nodes.

10. The computer system of claim 9, wherein the series of extracted key features are tabularized and stored, machine learning pipeline each time the computed quality value surpasses a predetermined comparative quality threshold.

11. The computer system of claim 7, wherein automatically computing the similarity scores for the subsets of the detected versions within each of the series of generated clusters further comprises:

automatically cross computing branch similarity values between the branches corresponding to the subsets of versions using a Levenshtein distance metric.

12. The computer system of claim 7, wherein automatically generating, and outputting to a user, the visual representation of the series of generated clusters including the version quality data and the version similarity data further comprises:

automatically tabularizing the computed similarity scores.

13. A computer program product, the computer program product comprising:

one or more non-transitory computer-readable tangible storage medium and program instructions stored on at least one of the one or more computer-readable tangible storage medium, the program instructions executable by a processor capable of performing a method, the method comprising:

a computer-based method of automated version management for machine learning pipeline development, the method comprising:

computing a quality value of a target machine learning pipeline at a predetermined regular interval, and automatically saving updated versions of the target machine learning pipeline based on the computed quality value;

extracting a series of key features from detected versions of the target machine learning pipeline;

clustering the detected versions of the target machine learning model pipeline by the extracted series of key features;

identifying a highest-quality version within each of a series of generated clusters;

computing similarity scores for subsets of the detected versions within each of the series of generated clusters for each version of the target machine learning pipeline being developed, wherein different versions of the series are analyzed to determine when a set of unique pairs of one or more individual versions exist that are both contained within a same cluster and encoding each branch into a machine learning operation sequence;

computing the similarity scores for the subsets of the detected versions within each of the series of generated clusters by automatically encoding a series of operations associated with branches corresponding to the subsets of versions;

computing a final similarity score for each version of the target machine learning pipeline by averaging values from each set of unique pairs;

generating and outputting to a user, using the final similarity score, a visual representation of the series of generated clusters including version quality data and version similarity data, wherein the visual representation includes a quality evolution visual depicting the highest-quality versions from each of the series of generated clusters in combination with the version quality data; and automatically saving at least one unique version of a given machine learning pipeline stream anytime a preselected amount of changes or modifications have been made for a later use in management of the given machine learning pipeline stream.

14. The computer program product of claim 13, wherein automatically computing the quality value of the target machine learning pipeline at the predetermined regular interval and automatically saving updated versions of the target machine learning pipeline based on the computed quality value further comprise:

automatically comparing the target machine learning pipeline to a previously saved iteration of the target machine learning pipeline, and saving an updated version of the target machine learning pipeline each time the computed quality value surpasses a predetermined comparative quality threshold.

15. The computer program product of claim 13, wherein the series of extracted key features comprise one or more of a number of data transformation nodes, a number of flow branches, a number of estimator nodes, a number of built models, and a number of data export nodes.

16. The computer program product of claim 15, wherein the series of extracted key features are tabularized and stored.

17. The computer program product of claim 13, wherein automatically computing the similarity scores for the subsets of the detected versions within each of the series of generated clusters further comprises:

automatically cross computing branch similarity values between the branches corresponding to the subsets of versions using a Levenshtein distance metric.

18. The computer program product of claim 13, wherein automatically generating, and outputting to a user, the visual representation of the series of generated clusters including the version quality data and the version similarity data further comprises:

automatically tabularizing the computed similarity scores.

* * * * *